(12) United States Patent
Banerjee et al.

(10) Patent No.: US 10,924,401 B2
(45) Date of Patent: Feb. 16, 2021

(54) LIVE APPLICATION AND KERNEL MIGRATION USING ROUTING TABLE ENTRIES

(71) Applicant: International Business Machines Corporation, Armonk, NY (US)

(72) Inventors: Dwip N. Banerjee, Austin, TX (US); Khalid Filali-Adib, Austin, TX (US); Frederic Barrat, Toulouse (FR); David Zhiwei Dai, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/412,717

(22) Filed: May 15, 2019

(65) Prior Publication Data
US 2020/0366604 A1 Nov. 19, 2020

(51) Int. Cl.
*G06F 9/48* (2006.01)
*H04L 12/741* (2013.01)

(52) U.S. Cl.
CPC .................... *H04L 45/74* (2013.01)

(58) Field of Classification Search
None
See application file for complete search history.

(56) References Cited

U.S. PATENT DOCUMENTS

| 8,155,129 | B2 | 4/2012 | Appanna et al. |
| 9,270,637 | B2 | 2/2016 | Zhao |
| 9,336,095 | B2 | 5/2016 | Hwang et al. |
| 9,491,042 | B1 | 11/2016 | Vinapamula Venkata |
| 2004/0114588 | A1* | 6/2004 | Bhaskaran ............ H04L 49/552 370/389 |
| 2014/0003358 | A1* | 1/2014 | Elliott ................... H04L 5/0048 370/329 |
| 2016/0092203 | A1* | 3/2016 | Filali-Adib ............. G06F 8/656 717/171 |
| 2016/0119417 | A1* | 4/2016 | Fang ....................... H04L 67/16 709/219 |
| 2016/0188462 | A1 | 6/2016 | Shin et al. |
| 2019/0036868 | A1* | 1/2019 | Chandrashekhar ... H04L 45/021 |
| 2019/0163644 | A1* | 5/2019 | Jayasena ............ G06F 12/1027 |
| 2020/0034193 | A1* | 1/2020 | Jayaram ................ G06F 3/0647 |
| 2020/0089526 | A1* | 3/2020 | Enguehard .......... G06F 9/45558 |
| 2020/0092252 | A1* | 3/2020 | Tillotson ............. H04L 61/3025 |

* cited by examiner

*Primary Examiner* — Brandon M Renner
(74) *Attorney, Agent, or Firm* — Garg Law Firm, PLLC; Rakesh Garg; David Quinn

(57) ABSTRACT

In a routing table of a first system, a routing table entry for a first application is created by a controller application executing in a controller system, the first application intended for relocation, a second application in the set of applications not intended for relocation. At the second system responsive to commencing execution of the first application in the second system at a second time, a mapping entry is created by a controller application, the mapping entry causing the forwarded packet to be delivered to the first application at the second system. Responsive to a notification that the first application is executing in the second system, the routing table entry of the first system is modified by the controller application, the modified entry causing a packet addressed to the first application to be forwarded from the first system to the second system.

20 Claims, 10 Drawing Sheets

US 10,924,401 B2

LIVE APPLICATION AND KERNEL MIGRATION USING ROUTING TABLE ENTRIES

TECHNICAL FIELD

The present invention relates generally to a method, system, and computer program product for application and kernel migration. More particularly, the present invention relates to a method, system, and computer program product for live application and kernel migration using routing table entries.

BACKGROUND

It is often necessary for a data center administrator to migrate operating system kernels, and applications running under those kernels, from one system to another. As used herein, a kernel is the core of a computer's operating system, servicing requests from applications executing on the computer. For example, a kernel and applications may be executing on a system an administrator may want to take out of service, either temporarily or permanently. As another example, another system has become available with resources that are better suited to a particular application or kernel than that software's present execution location.

Checkpointing, as used herein, refers to capturing a current state of a kernel or application. To migrate a kernel or application, the kernel or application is checkpointed, creating a checkpointed image. Then the checkpointed image is copied to a new system and the kernel or application is restarted in the new system. While the migration is occurring, an original application continues to service client requests. Once an application has been migrated and restarted, the application services client requests from the new location. As a result, the application is always able to serve customer requests, avoiding downtime. Migrating a kernel or application without downtime is referred to herein as live migration. Downtime of an application or kernel is a period during which the application or kernel is unavailable or inaccessible for providing a service for which the application or kernel is configured.

SUMMARY

The illustrative embodiments provide a method, system, and computer program product. An embodiment includes a method that creates, by a controller application executing in a controller system, in a routing table of a first system, a routing table entry for a first application in a set of applications, the first application intended for relocation from the first system to a second system, the first application executing in the first system at a first time, a second application in the set of applications not intended for relocation. An embodiment creates, by the controller application, at the second system responsive to commencing execution of the first application in the second system at a second time, a mapping entry, the mapping entry causing the forwarded packet to be delivered to the first application at the second system. An embodiment modifies, by the controller application, responsive to a notification that the first application is executing in the second system, the routing table entry of the first system, the modified entry causing a packet addressed to the first application to be forwarded from the first system to the second system.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
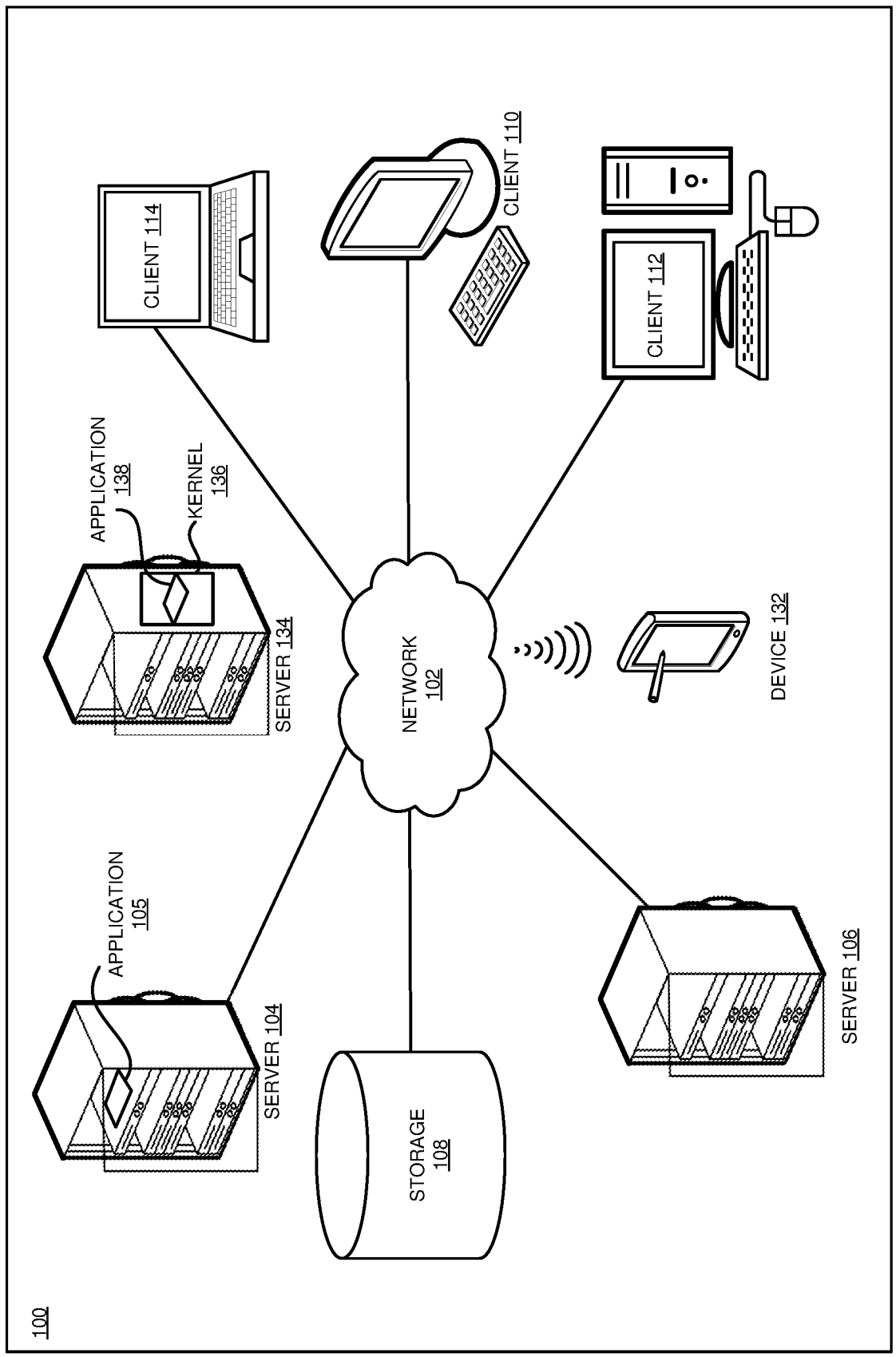
FIG. 1 depicts a block diagram of a network of data processing systems in which illustrative embodiments may be implemented.

The illustrative embodiments recognize that current techniques for live migration using checkpointing and restarting use one checkpointed image that includes a kernel and all applications executing using that kernel. Migrating the entire checkpointed image in one operation requires the provisioning of a new system with similar resources as the original system.

The illustrative embodiments also recognize that not every application running on a kernel may need to be migrated without downtime. Often, only certain critical applications must stay accessible through a migration. Sometimes, there are no critical applications executing.

Consequently, the illustrative embodiments recognize that current methods for live migration are not efficient at least because they migrate more applications or data than necessary. In addition, data may need to be migrated in conjunction with or separate from an application or kernel migration. Migrating unneeded applications or data uses more resources than necessary, both during migration and at the destination. As well, maintaining the state of the additional applications or data during migration can add unnecessary complexity to the migration. Thus, the illustrative embodiments recognize that what is needed in the art is a live migration technique that can be performed on a selective basis, such as a per-application basis, and consequently uses only the resources needed to migrate a selected application or data.

For the compactness and clarity of the description, and only as a non-limiting example, various embodiments are described with respect to live-migrating one entity—e.g., an application, or a kernel, or application data, or kernel data—without implying any limitation thereto. Unless expressly distinguished where a specific entity is live-migrated, a feature of an embodiment is similarly applicable for live-migrating an application or a portion thereof, a kernel or a portion thereof, application data, kernel data, and other entities that can be live-migrated in a similar manner, without departing the scope of the illustrative embodiments.

The illustrative embodiments recognize that the presently available tools or solutions do not address these needs or provide adequate solutions for these needs. The illustrative embodiments used to describe the invention generally address and solve the above-described problems and other problems related to live application and kernel migration using routing table entries.

An embodiment can be implemented as a software application. The application implementing an embodiment can be configured as a modification of an existing network control system, as a separate application that operates in conjunction with an existing network control system, a standalone application, or some combination thereof.

Particularly, some illustrative embodiments provide a method by which a single application or kernel, or a portion or component thereof, can be migrated without disrupting the functionality of the migrated application or disrupting network traffic to the application or kernel.

For convenience in description, consider a non-limiting example of a kernel, and an application running on that kernel, that are to be live migrated. Both kernel and application are currently executing on network node 1, a system on a network. Node 1 uses IP address 1.1.1.1. The application to be migrated uses port 1234. Both the IP address and the port number are intended as non-limiting examples, and the scope of the embodiments is not limited to any particular port number, port identification scheme, IP address, IP addressing scheme, or any other particular means of identifying network traffic intended for a kernel or an application.

Presently-used kernel implementations are capable of port forwarding. Port forwarding is an application of network address translation (NAT) that redirects a communication request from one address and port number combination to another address and port number combination. Implementations typically store each currently-active port forwarding in a routing table, with each individual entry in the table describing a particular forwarding. Each routing table entry includes a port number and target address defining where traffic for that port should be redirected. In addition, each routing table entry can be designated as forwardable (i.e., matching traffic should be forwarded) or not forwardable (i.e., matching traffic should not be forwarded).

To begin the application migration process, an embodiment creates a routing table entry for the application in the system on which the application is currently running. The routine table entry can be in memory used by the kernel or in memory used by an application running on the system. The entry specifies a port the application uses, and the address of the system to which the application will be moving. The entry is inactive when created. When activated, the entry will cause any traffic intended for the application to be forwarded to the application's new location.

Continuing the example, suppose the application using port 1234 is to be migrated from node 1 to node 3, which uses IP address 1.1.1.3. An embodiment creates a corresponding example routing table entry: (entryNum: x, port: 1234, targetIP: 1.1.1.3, forwardable: N). Here, entryNum denotes a number for the entry in the routing table, where x can be any number. Port denotes the port number of the application to be migrated—for example, 1234. TargetIP denotes the address of the system to which the application is being migrated—for example, 1.1.1.3. Forwardable denotes whether traffic matching the entry should be forwarded or not—here, N for no.

An embodiment uses any suitable technique to checkpoint an application being migrated, copy the checkpoint image, and restart the application in its new location. Alternatively, another system, or an administrator, performs the migration process. During this process, the original application remains active on its original kernel, servicing client requests.

When the migrating application is ready to service client requests at the new location, an embodiment creates a mapping entry in the kernel of the new location. The mapping entry specifies that packets on the network, received at the new location and addressed to the migrated application at the application's port number and previous IP address, are delivered to the application at the new location. One embodiment implements the mapping entry as part of a NAT table. A NAT table performs network address translation, forwarding incoming network packets to particular applications, at particular port numbers, executing on a system. Another embodiment implements the mapping entry in a listening entry within a protocol table of the kernel. A listening entry informs a kernel that when an incoming network packet addressed to a particular application, at a particular port number, is received, that packet should be forwarded to the addressed application. Other mapping entry implementations, on the application's new system or a different location within a network, are also possible and contemplated within the scope of the illustrative embodiments.

Continuing the example, when the migrating application is ready to service client requests at the new location, an embodiment creates an example mapping entry on the new system (using IP address 1.1.1.3) is: (port: 1234, originalIP: 1.1.1.1). As a result, any traffic addressed to the application at port 1234 and IP address 1.1.1.1 (the system address from which the application is being migrated) that is received at the new system is forwarded to the application on the new system.

An embodiment determines that the migrated application is ready to service client requests at its new location. In one embodiment, the application's new system notifies the application's old system. In another embodiment, the application's old system polls the new system, or the application at the new system. Another embodiment running on a third system, such as a controller system, polls or monitors the new system and notifies the old system. Once the determination is made, an embodiment activates the routing table entry in the first kernel, for example by changing the forwardable status of the entry from N (i.e., no) to Y (i.e., yes). After the modification, a packet of network traffic addressed to the application at the first system is forwarded to the application's new location on the second system. At the new location, the packet is delivered to the migrated application. As a result, an embodiment has migrated the application from an original location to a new location, without interfering with network traffic to the application or the application's ability to service client requests.

Continuing the example, after modification the example routing table entry on the original system (using IP address 1.1.1.1) is now: (entryNum: x, port: 1234, targetIP: 1.1.1.3, forwardable: Y). As a result, the original system forwards any traffic for the application, addressed to port 1234 at IP address 1.1.1.1, to port 1234 at IP address 1.1.1.3. At 1.1.1.3, the packet is delivered to the migrated application.

Once network traffic is being forwarded to the migrated application at the new location, an embodiment is configurable to notify other systems on the network of the application's new location, to eliminate the need for forwarding. In another embodiment, notification is not performed; instead, other systems on the network can discover the application's new location through other presently-used methods. In another embodiment, forwarding continues until explicitly disabled, using further changes to the mapping entry and routing table entry. For example, the application migration may have been temporary, and the application migrated back to the original system after a short period of time.

Once one or more applications have been migrated to new locations, an embodiment is configurable to stop application execution at the original location. Because an application at the original location is no longer receiving network traffic, resources used by the original application can be reclaimed for another use.

Once all mission-critical applications—those that must continue to service client requests during migration—have been migrated to new locations, an embodiment can migrate the kernel on which the migrated applications were executing. An embodiment uses any suitable technique to checkpoint a kernel being migrated, copy the checkpoint image, and restart the kernel in its new location. Alternatively, another system, or an administrator, performs the kernel migration process. During this process, the original kernel continues to service applications.

As part of the kernel migration process, an embodiment relocates the routing table of the kernel. Relocating the routing table ensures that traffic forwarding for a migrated application continues after the kernel is relocated. Once the kernel migration is complete, an embodiment can notify other systems on the network that the kernel, using a particular IP address, has been relocated to different hardware having a different Media Access Control (MAC) address. As a result of the relocation, traffic for the kernel, or applications running on the kernel, is directed to a new combination of IP address and MAC address. One embodiment uses a gratuitous Address Resolution Protocol (ARP) response. Although titled a response, a gratuitous ARP is not prompted by an ARP request message. Instead, a gratuitous ARP is a broadcast, announcing a new association of an IP address with a MAC address.

Continuing the example, suppose the kernel on network node 1 (using IP address 1.1.1.1) is being migrated to node 2, which uses IP address 1.1.1.2. As part of the kernel migration process, the routing table of the kernel, including the entry specifying forwarding for the previously-migrated application, is also moved. As a result, the kernel on node 2 now has a routing table with an entry (entryNum: x, port: 1234, targetIP: 1.1.1.3, forwardable: Y). In addition, the kernel notifies other nodes on the network that it has moved from IP address 1.1.1.1 to IP address 1.1.1.2. As a result, other nodes on the network will address the kernel, and any applications the other nodes believe to be running on the kernel, using IP address 1.1.1.2 instead. If node 2 receives any traffic for the migrated application, node 2 forwards that traffic, addressed to port 1234 at IP address 1.1.1.2, to port 1234 at IP address 1.1.1.3. At 1.1.1.3, the packet is delivered to the migrated application.

Once a kernel has been migrated to a new location, an embodiment is configurable to stop kernel execution at the original location. Because a kernel at the original location is no longer receiving network traffic, resources used by the original kernel can be reclaimed for another use. For example, the kernel's original system can be shut down and relocated to a different location, or a software update can be performed on the original kernel and the system restarted. In addition, if desired, once the original system is available, a kernel and application can be migrated back to the original system in a manner described herein.

An embodiment can also be used to migrate groups of applications in parallel. For example, if a large group of applications must be migrated, the group can be divided into smaller groups, then each smaller group migrated in one operation.

The manner of live application and kernel migration using routing table entries described herein is unavailable in the presently available methods in the technological field of endeavor pertaining to network system management. A method of an embodiment described herein, when implemented to execute on a device or data processing system, comprises substantial advancement of the functionality of that device or data processing system in forwarding network traffic to the new location of a migrated application or kernel, without interrupting an application's or kernel's ability to service client requests.

The illustrative embodiments are described with respect to certain types of nodes, kernels, ports, addresses, migrations, forwardings, broadcasts, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
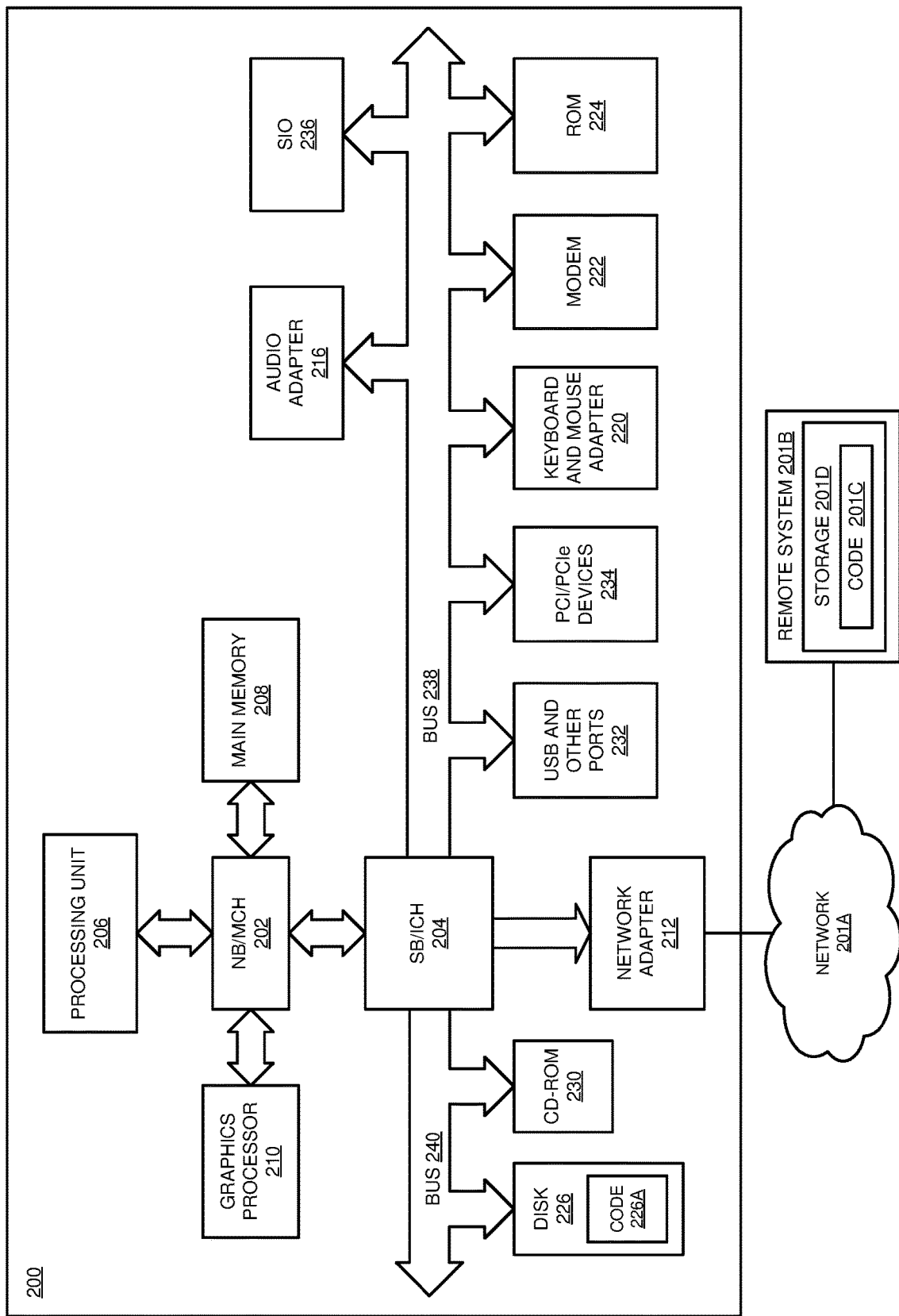
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104, 134, and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 134, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute on any of Servers 104, 134, and 106, clients 110, 112, and 114, and device 132. Application 105 can be used to migrate application 138, running on kernel 136, to server 106 or another server on network 102. Application 105 can also be used to migrate kernel 136 to server 106 or another server on network 102.

Servers 104, 134, and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104, 134, and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105, application 138, and kernel 136 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
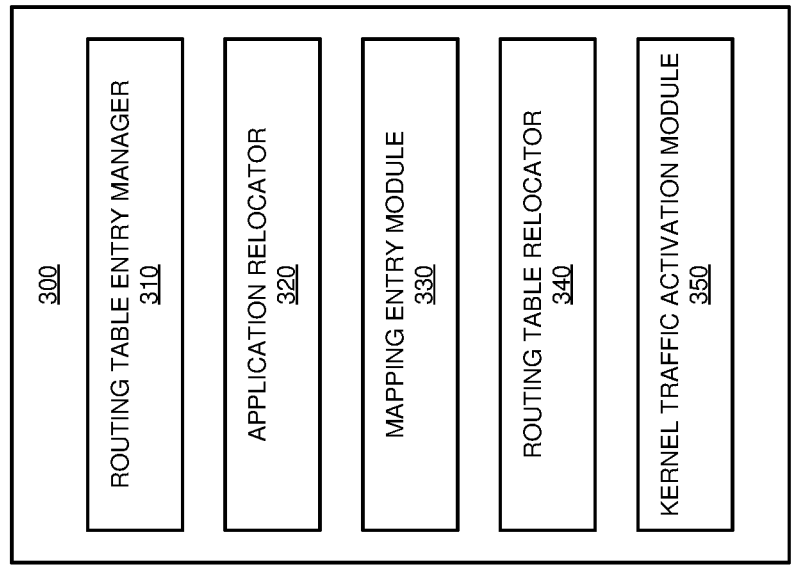
FIG. 3 depicts a block diagram of an example configuration for live application and kernel migration using routing table entries in accordance with an illustrative embodiment.

With reference to FIG. 3, this figure depicts a block diagram of an example configuration for live application and kernel migration using routing table entries in accordance with an illustrative embodiment. Application 300 is an example of application 105 in FIG. 1 and executes in any of servers 104, 106, and 134 in FIG. 1.

Routing table entry manager 310 creates a routing table entry for the application in the kernel on which the application is currently running. The entry specifies a port the application uses, and the address of the system to which the application will be moving. The entry is inactive when created. When activated, the entry will cause any traffic intended for the application to be forwarded to the application's new location.

Application relocator 320 uses any suitable technique to checkpoint an application being migrated, copy the checkpoint image, and restart the application in its new location. Alternatively, application relocator 320 interfaces with another application that performs the relocation.

When the migrating application is ready to service client requests at the new location, mapping entry module 330 creates a mapping entry in the kernel of the new location. The mapping entry specifies that packets on the network, received at the new location and addressed to the migrated application at the application's port number and previous IP address, are delivered to the application at the new location. Mapping entry module 330 can implement the mapping entry as part of a NAT table on the destination system of the application being migrated, or in a listening entry within a protocol table of the kernel on the destination system of the application being migrated.

Application relocator 320 determines that the migrated application is ready to service client requests at its new location, and notifies the application's old system. After receipt of the notification, routing table entry manager 310 activates the routing table entry in the kernel of the migrated application's original system, for example by changing the forwardable status of the entry from N (i.e., no) to Y (i.e., yes). After the modification, a packet of network traffic addressed to the application at the first system is forwarded to the application's new location on the second system. At the new location, the packet is delivered to the migrated application.

Once all mission-critical applications have been migrated to new locations, application 300 can migrate the kernel on which the migrated applications were executing. As part of the kernel migration process, routing table relocator 340 relocates the routing table of the kernel. Relocating the routing table ensures that traffic forwarding for a migrated application continues after the kernel is relocated. Once the kernel migration is complete, kernel traffic activation module 350 notifies other systems on the network that the kernel has been relocated and that traffic for the kernel, or applications running on the kernel, should be addressed to the kernel's new location. To perform the notification, kernel traffic activation module 350 uses a gratuitous ARP response. As a result, other nodes in the network will address traffic for applications on the migrated kernel using the kernel's new address.

Figure 4:
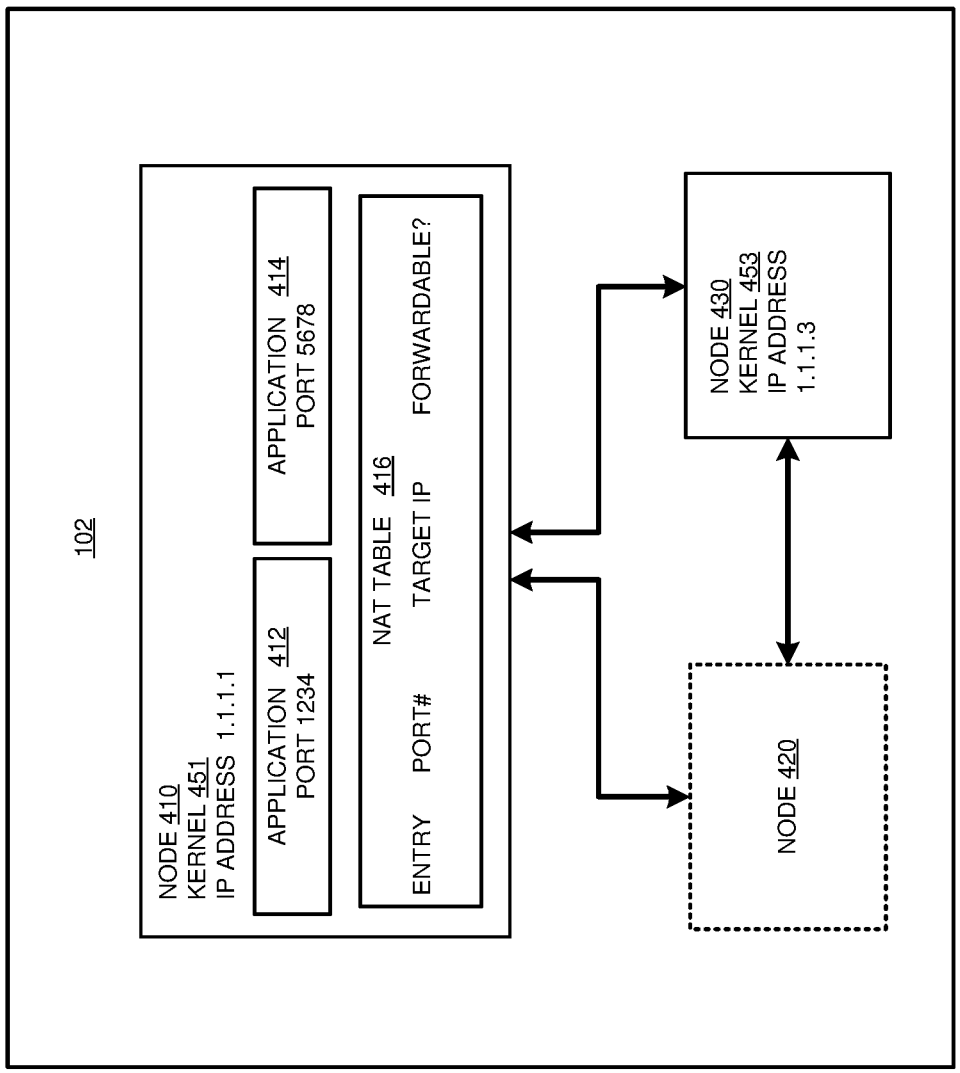
FIG. 4 depicts an example of live application and kernel migration using routing table entries in accordance with an illustrative embodiment.

With reference to FIG. 4, this figure depicts an example of live application and kernel migration using routing table entries in accordance with an illustrative embodiment. The example can be executed using application 300 in FIG. 3 in any of servers 104, 106, and 134 in FIG. 1. Network 102 is the same as network 102 in FIG. 1.

As depicted, nodes 410, 420, and 430 are systems on network 102. Kernel 451 runs on node 410. Application 412, using port 1234, runs in kernel 451. Application 414, using port 5678, also runs in kernel 451. Kernel 451 also includes NAT table 416, which is currently empty. Node 410 uses IP address 1.1.1.1. Application 412 is to be migrated to node 430, which uses IP address 1.1.1.3. Application 414 is not mission-critical, and will not be migrated. Once application 412 has been migrated, kernel 451 will be migrated to node 420.

Figure 5:
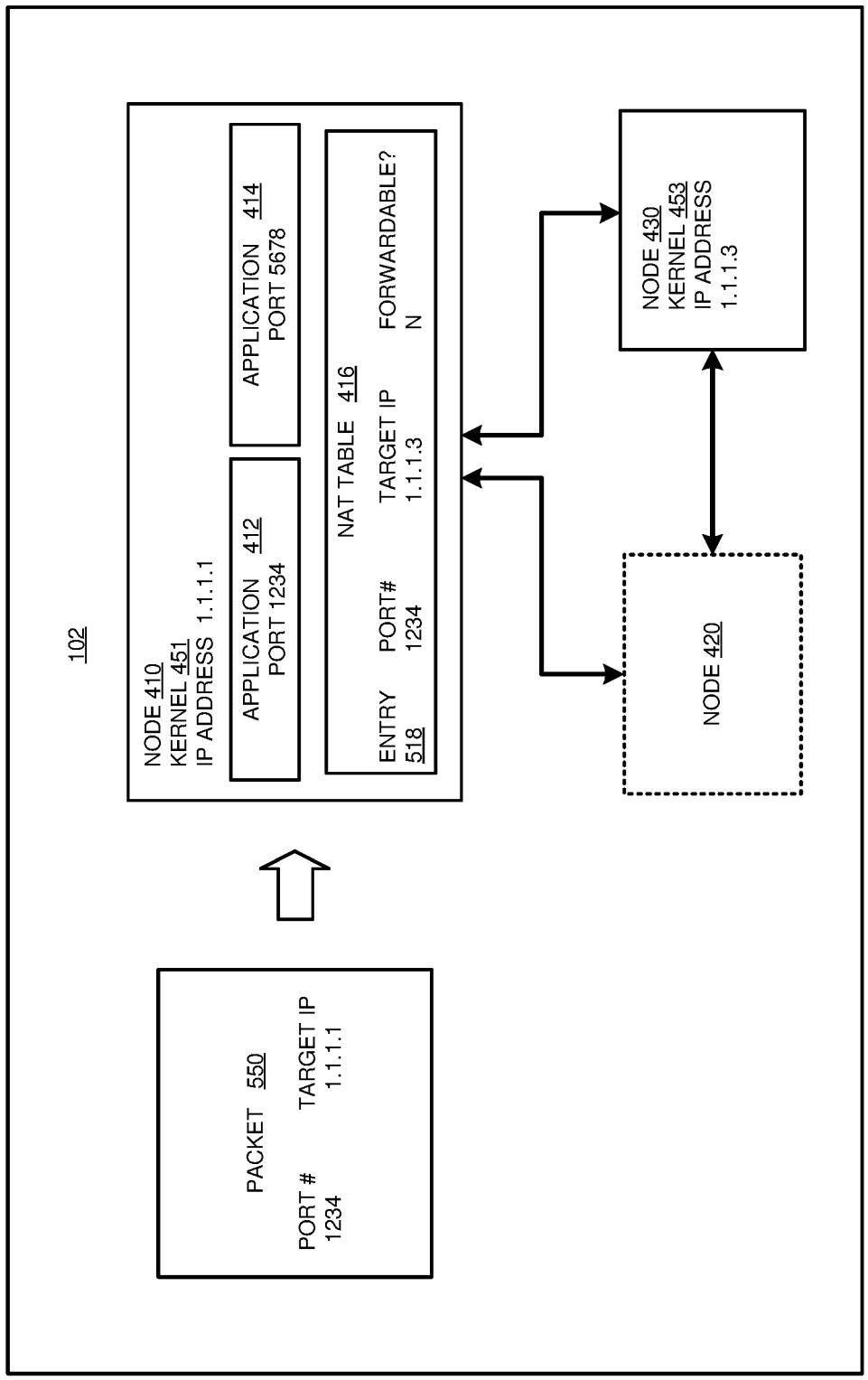
FIG. 5 depicts a continuing example of live application and kernel migration using routing table entries in accordance with an illustrative embodiment.

With reference to FIG. 5, this figure depicts a continuing example of live application and kernel migration using routing table entries in accordance with an illustrative embodiment. The example can be executed using application 300 in FIG. 3 in any of servers 104, 106, and 134 in FIG. 1. Network 102 is the same as network 102 in FIG. 1. Nodes 410, 420, and 430, applications 412 and 414, NAT table 416, and kernels 451 and 453 are the same as nodes 410, 420, and 430, applications 412 and 414, NAT table 416, and kernels 451 and 453 in FIG. 4.

Application 412, using port 1234, is to be migrated from node 410 to node 430, which uses IP address 1.1.1.3. Thus, application 300 has created routing table entry 518, designating traffic for port 1234 to be forwarded to target IP address 1.1.1.3. However, because entry 518 is not marked forwardable, entry 518 is not yet active to actually forward traffic. As a result, packet 550, intended for application 412, will not be forwarded from node 410.

Figure 6:
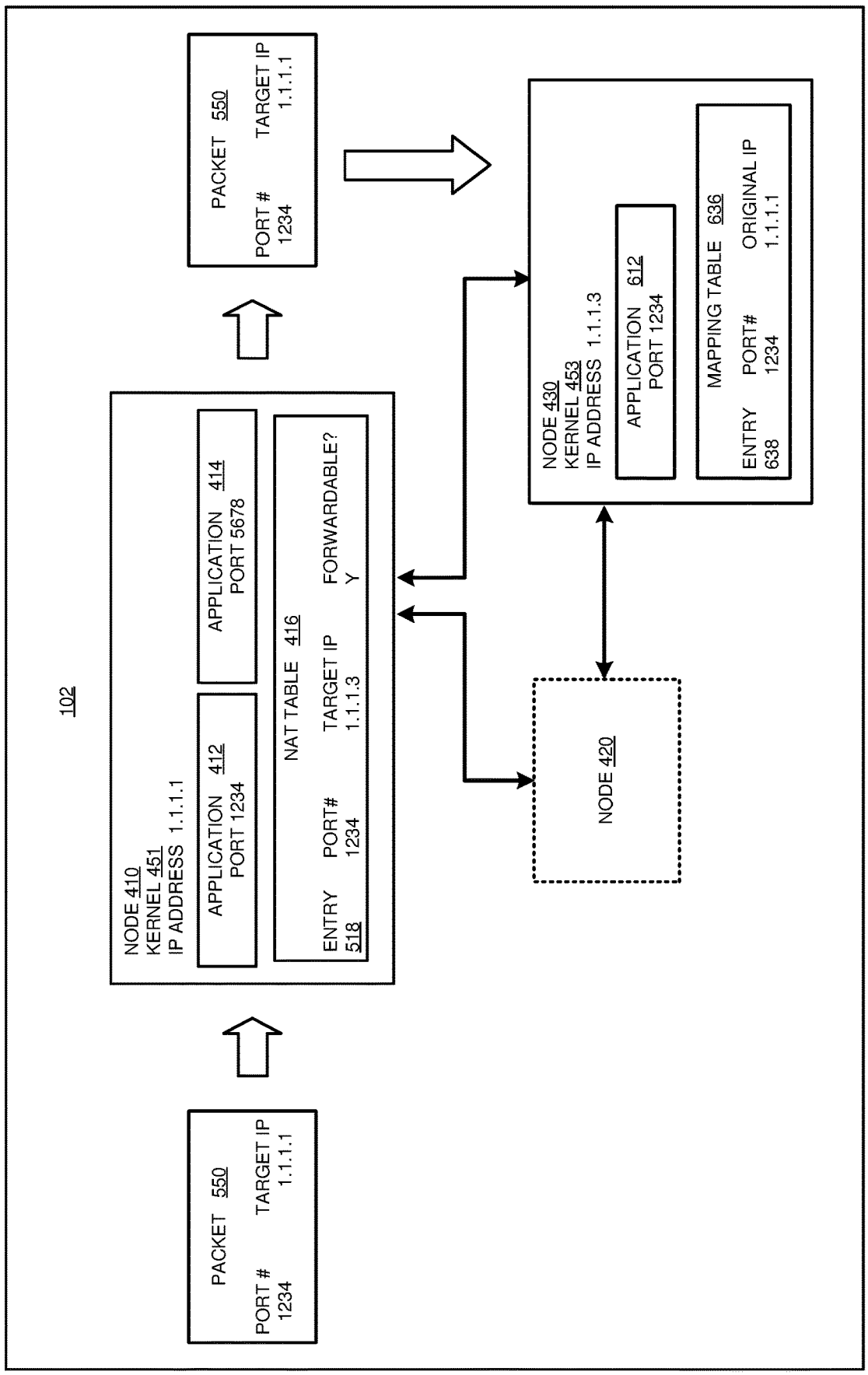
FIG. 6 depicts a continuing example of live application and kernel migration using routing table entries in accordance with an illustrative embodiment.

With reference to FIG. 6, this figure depicts a continuing example of live application and kernel migration using routing table entries in accordance with an illustrative embodiment. The example can be executed using application 300 in FIG. 3 in any of servers 104, 106, and 134 in FIG. 1. Network 102 is the same as network 102 in FIG. 1. Nodes 410, 420, and 430, applications 412 and 414, NAT table 416, kernels 451 and 453, packet 550, and entry 518 are the same as nodes 410, 420, and 430, applications 412 and 414, NAT table 416, kernels 451 and 453, packet 550, and entry 518 in FIG. 5.

Application 412 has now been migrated to application 612, running in kernel 453 on node 430. Application 412, still on kernel 451, can be placed in a dormant state to avoid potential interference with application 612 running in kernel 453. Mapping table 636, in node 430, now includes mapping entry 638. Mapping entry 638 specifies that any traffic addressed to application 412 at port 1234 and IP address 1.1.1.1 (the former location of application 412) that is received at node 430 is to be forwarded to application 412.

In addition, NAT table entry 518 has now been marked forwardable. As a result, kernel 451 forwards any traffic for the application, addressed to port 1234 at IP address 1.1.1.1 (such as packet 550), to port 1234 at IP address 1.1.1.3 (node 430). At node 430, packet 550 is delivered to application 412, now migrated.

Figure 7:
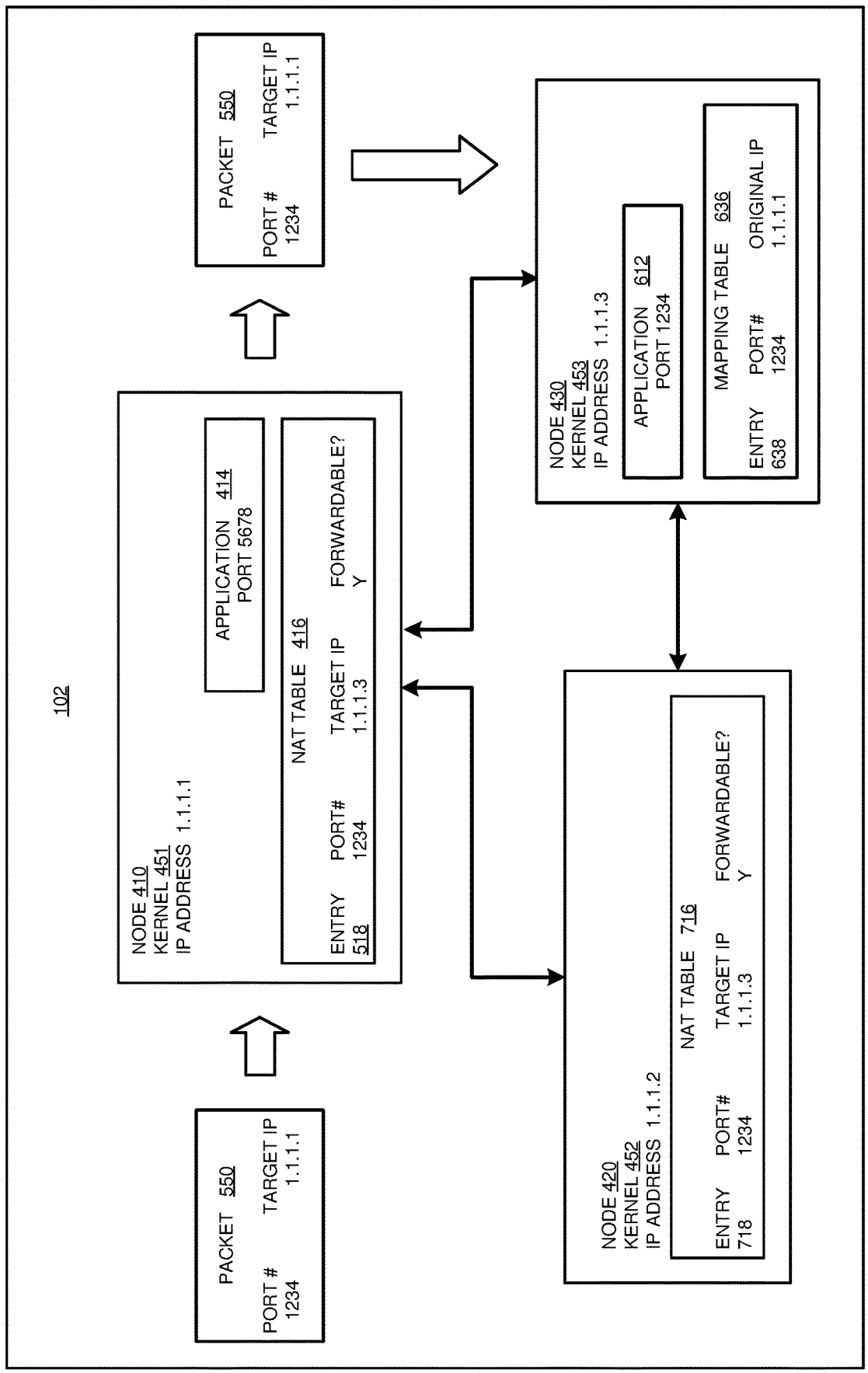
FIG. 7 depicts a continuing example of live application and kernel migration using routing table entries in accordance with an illustrative embodiment.

With reference to FIG. 7, this figure depicts a continuing example of live application and kernel migration using routing table entries in accordance with an illustrative embodiment. The example can be executed using application 300 in FIG. 3 in any of servers 104, 106, and 134 in FIG. 1. Network 102 is the same as network 102 in FIG. 1. Nodes 410, 420, and 430, applications 612 and 414, NAT table 416, kernels 451 and 453, packet 550, entry 518, mapping table 636, and mapping table entry 638 are the same as nodes 410, 420, and 430, applications 612 and 414, NAT table 416, kernels 451 and 453, packet 550, entry 518, mapping table 636, and mapping table entry 638 in FIG. 6.

Here, kernel 451 on node 410 is being migrated to node 420. As part of the kernel migration process, NAT table 716, including entry 718 specifying forwarding for the previously-migrated application, has been copied from NAT table 416 in kernel 451.

Figure 8:
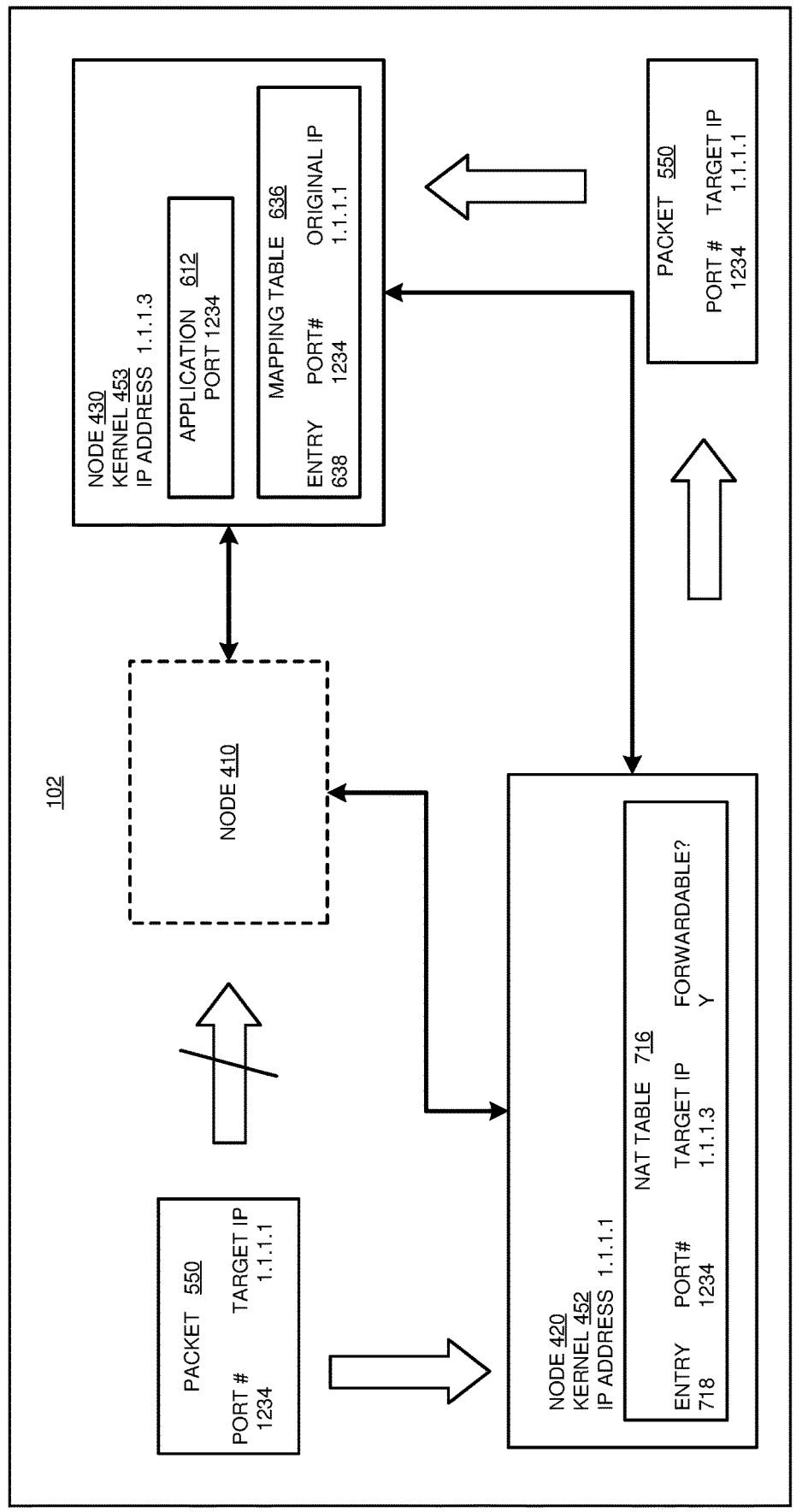
FIG. 8 depicts a continuing example of live application and kernel migration using routing table entries in accordance with an illustrative embodiment.

With reference to FIG. 8, this figure depicts a continuing example of live application and kernel migration using routing table entries in accordance with an illustrative embodiment. The example can be executed using application 300 in FIG. 3 in any of servers 104, 106, and 134 in FIG. 1. Network 102 is the same as network 102 in FIG. 1. Nodes 410, 420, and 430, application 612, NAT table 716, kernel 453, packet 550, entry 718, mapping table 636, and mapping table entry 638 are the same as nodes 410, 420, and 430, application 612, NAT table 716, kernel 453, packet 550, entry 718, mapping table 636, and mapping table entry 638 in FIG. 7.

As depicted, kernel 452, using IP address 1.1.1.1, has notified other nodes on network 102 that it has moved from node 410 to node 420. As a result, any traffic addressed to kernel 452, and any applications the other nodes believe to be running on the kernel, at node 410 will be delivered to node 420 instead. If node 420 receives any traffic for migrated application 612 (e.g. packet 550), node 420 forwards that traffic, addressed to port 1234, to port 1234 at IP address 1.1.1.3. At 1.1.1.3 (node 430), packet 550 is delivered to application 612. In addition, node 410 is now offline.

Figure 9:
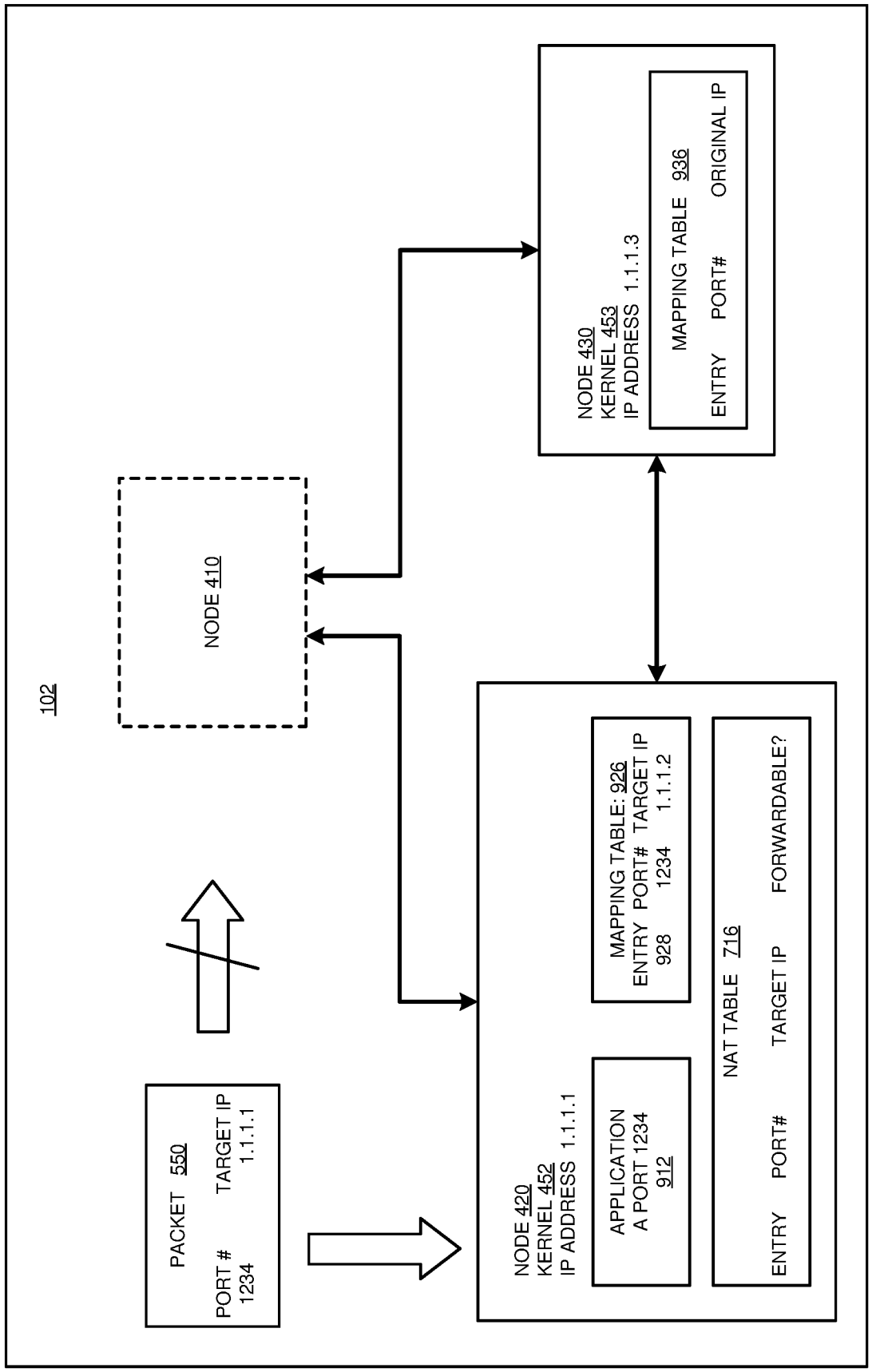
FIG. 9 depicts a continuing example of live application and kernel migration using routing table entries in accordance with an illustrative embodiment.

With reference to FIG. 9, this figure depicts a continuing example of live application and kernel migration using routing table entries in accordance with an illustrative embodiment. The example can be executed using application 300 in FIG. 3 in any of servers 104, 106, and 134 in FIG. 1. Network 102 is the same as network 102 in FIG. 1. Nodes 410, 420, and 430, application 612, NAT table 716, kernel 453, packet 550, entry 718, mapping table 636, and mapping table entry 638 are the same as nodes 410, 420, and 430, application 612, NAT table 716, kernel 453, packet 550, entry 718, mapping table 636, and mapping table entry 638 in FIG. 8.

As depicted, application 612 formerly executing on kernel 453 has been migrated to application 912 on kernel 452. Kernel 452 now includes mapping table 926, with entry 928, to forward traffic (e.g. packet 550) intended for the application using port 1234 to application 912. Kernel 452 also includes NAT table 716, which no longer includes entry 718 because there is no longer a need to forward application traffic for application 712 to node 430.

Figure 10:
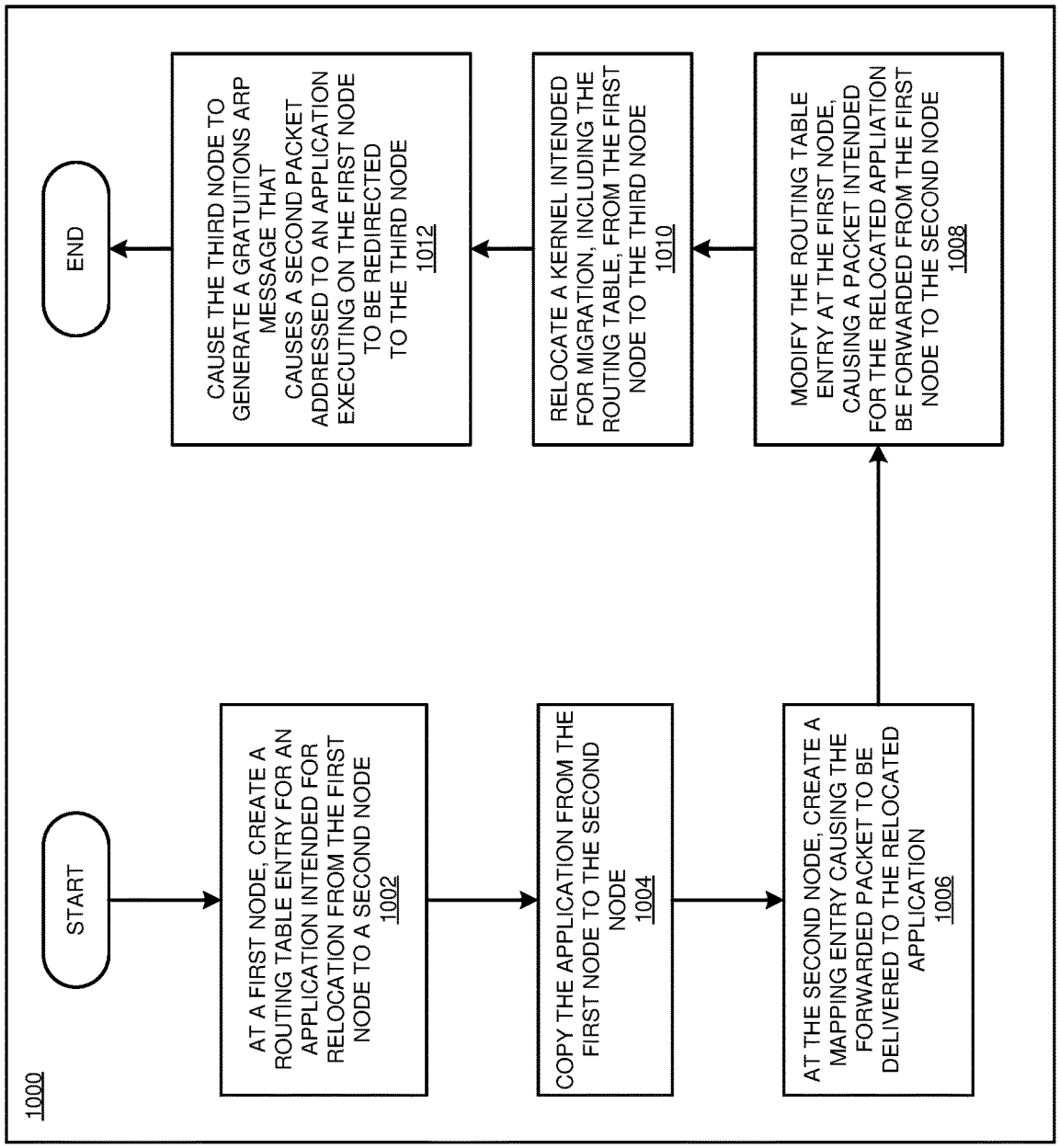
FIG. 10 depicts a flowchart of an example process for live application and kernel migration using routing table entries in accordance with an illustrative embodiment.

With reference to FIG. 10, this figure depicts a flowchart of an example process for live application and kernel migration using routing table entries in accordance with an illustrative embodiment. Process 1000 can be implemented in application 300 in FIG. 3.

In block 1002, the application creates a routing table entry, at a first node, for an application requiring relocation from the first node to a second node. In block 1004, the application copies the application from the first node to the second node. In block 1006, the application creates, at the second node, a mapping entry causing the forwarded packet to be delivered to the relocated application. In block 1008, the application modifies the routing table entry at the first node, causing a packet intended for the relocated application be forwarded from the first node to the second node. In block 1010, the application relocates a kernel requiring migration, including the routing table, from the first node to the third node. In block 1012, the application causes the third node to generate a gratuitous ARP message that causes a second packet addressed to an application executing on the first node to be redirected to the third node. Then the application ends.

Thus, a computer implemented method, system or apparatus, and computer program product are provided in the illustrative embodiments for live application and kernel migration using routing table entries and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
creating, by a controller application executing in a controller system, in a routing table of a first system, a routing table entry for a first application in a set of applications, the first application intended for relocation from the first system to a second system, the first application executing in the first system at a first time, a second application in the set of applications not intended for relocation;
commencing, responsive to relocating the first application from the first system to the second system, execution of the first application on the second system;
creating, by the controller application, at the second system responsive to commencing execution of the first application in the second system at a second time, a mapping entry, the mapping entry causing a forwarded packet to be delivered to the first application at the second system; and
modifying, by the controller application, responsive to a notification that the first application is executing in the second system, the routing table entry of the first system, the modified entry causing a packet addressed to the first application to be forwarded from the first system to the second system.

2. The method of claim 1, further comprising:
creating, by the controller application in the routing table of a third system, a second routing table entry for the first application, the first application intended for further relocation from the second system to the third system;
creating, by the controller application executing in the controller system, at the third system responsive to commencing execution of the first application in the third system, a second mapping entry, the mapping entry causing the forwarded packet to be delivered to the first application at the third system; and
modifying, by the controller application, responsive to a notification that the first application is executing in the third system, the routing table entry of the second system, the modified entry causing a packet addressed to the first application to be forwarded from the second system to the third system.

3. The method of claim 1, further comprising:
relocating, by the controller application as part of a kernel relocation from the first system to a third system, the routing table to the third system; and
causing, by the controller application executing in the controller system responsive to completing the kernel relocation, the third system to broadcast a signal, the signal causing a second packet addressed to an application executing on the first system to be redirected to the third system.

4. The method of claim 3, further comprising:
creating, by the controller application in the routing table of the third system, a second routing table entry for the first application, the first application intended for further relocation from the second system to the third system;
creating, by the controller application at the third system responsive to commencing execution of the first application in the third system, a second mapping entry, the mapping entry causing the forwarded packet to be delivered to the first application at the third system; and
modifying, by the controller application, responsive to a notification that the first application is executing in the third system, the routing table entry of the second system, the modified entry causing a packet addressed to the first application to be forwarded from the second system to the third system.

5. The method of claim 1, wherein the routing table entry comprises a port number corresponding to the first application intended for relocation and an IP address of the second system.

6. The method of claim 1, wherein the mapping entry comprises a port number corresponding to the first application intended for relocation and an IP address of the first system.

7. The method of claim 1, wherein the forwarded packet comprises a port number corresponding to the first application and an IP address of the first system.

8. The method of claim 3, wherein the signal comprises a gratuitous Address Resolution Protocol (ARP) response, wherein a gratuitous ARP response comprises a broadcast announcing a new association of an IP address with a Media Access Control (MAC) address.

9. A computer usable program product comprising one or more computer-readable storage devices, and program instructions stored on at least one of the one or more storage devices, the stored program instructions comprising:
program instructions to create, by a controller application executing in a controller system, in a routing table of a first system, a routing table entry for a first application in a set of applications, the first application intended for relocation from the first system to a second system, the first application executing in the first system at a first time, a second application in the set of applications not intended for relocation;
program instructions to commence, responsive to relocating the first application from the first system to the second system, execution of the first application on the second system;
program instructions to create, by the controller application, at the second system responsive to commencing execution of the first application in the second system at a second time, a mapping entry, the mapping entry causing a forwarded packet to be delivered to the first application at the second system; and
program instructions to modify, by the controller application, responsive to a notification that the first application is executing in the second system, the routing table entry of the first system, the modified entry causing a packet addressed to the first application to be forwarded from the first system to the second system.

10. The computer usable program product of claim 9, further comprising:
program instructions to create, by the controller application in the routing table of a third system, a second routing table entry for the first application, the first application intended for further relocation from the second system to the third system;
program instructions to create, by the controller application executing in the controller system, at the third system responsive to commencing execution of the first application in the third system, a second mapping entry, the mapping entry causing the forwarded packet to be delivered to the first application at the third system; and
program instructions to modify, by the controller application, responsive to a notification that the first application is executing in the third system, the routing table entry of the second system, the modified entry causing a packet addressed to the first application to be forwarded from the second system to the third system.

11. The computer usable program product of claim 9, further comprising:
program instructions to relocate, by the controller application as part of a kernel relocation from the first system to a third system, the routing table to the third system; and
program instructions to cause, by the controller application executing in the controller system responsive to completing the kernel relocation, the third system to broadcast a signal, the signal causing a second packet addressed to an application executing on the first system to be redirected to the third system.

12. The computer usable program product of claim 11, further comprising:
program instructions to create, by the controller application in the routing table of the third system, a second routing table entry for the first application, the first application intended for further relocation from the second system to the third system;
program instructions to create, by the controller application at the third system responsive to commencing execution of the first application in the third system, a second mapping entry, the mapping entry causing the forwarded packet to be delivered to the first application at the third system; and
program instructions to modify, by the controller application, responsive to a notification that the first application is executing in the third system, the routing table entry of the second system, the modified entry causing a packet addressed to the first application to be forwarded from the second system to the third system.

13. The computer usable program product of claim 9, wherein the routing table entry comprises a port number corresponding to the first application intended for relocation and an IP address of the second system.

14. The computer usable program product of claim 9, wherein the mapping entry comprises a port number corresponding to the first application intended for relocation and an IP address of the first system.

15. The computer usable program product of claim 9, wherein the forwarded packet comprises a port number corresponding to the first application and an IP address of the first system.

16. The computer usable program product of claim 11, wherein the signal comprises a gratuitous Address Resolution Protocol (ARP) response, wherein a gratuitous ARP response comprises a broadcast announcing a new association of an IP address with a Media Access Control (MAC) address.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to create, by a controller application executing in a controller system, in a routing table of a first system, a routing table entry for a first application in a set of applications, the first application intended for relocation from the first system to a second system, the first application executing in the first system at a first time, a second application in the set of applications not intended for relocation;

program instructions to commence, responsive to relocating the first application from the first system to the second system, execution of the first application on the second system;

program instructions to create, by the controller application, at the second system responsive to commencing execution of the first application in the second system at a second time, a mapping entry, the mapping entry causing a forwarded packet to be delivered to the first application at the second system; and program instructions to modify, by the controller application, responsive to a notification that the first application is executing in the second system, the routing table entry of the first system, the modified entry causing a packet addressed to the first application to be forwarded from the first system to the second system.

20. The system of claim 19, further comprising:

program instructions to create, by the controller application in the routing table of a third system, a second routing table entry for the first application, the first application intended for further relocation from the second system to the third system;

program instructions to create, by the controller application executing in the controller system, at the third system responsive to commencing execution of the first application in the third system, a second mapping entry, the mapping entry causing the forwarded packet to be delivered to the first application at the third system; and program instructions to modify, by the controller application, responsive to a notification that the first application is executing in the third system, the routing table entry of the second system, the modified entry causing a packet addressed to the first application to be forwarded from the second system to the third system.

\* \* \* \* \*